United States Patent [19]
Witt et al.

[11] Patent Number: 6,031,208
[45] Date of Patent: Feb. 29, 2000

[54] TOPLESS HOLDING BIN WITH SIDE HEAT SOURCE

[75] Inventors: Allan E. Witt, Brown Deer; Louis S. Anich, Jr., Mukwonago; John P. Scanlon, Sturgeon Bay, all of Wis.

[73] Assignee: Hatco Corporation, Milwaukee, Wis.

[21] Appl. No.: 09/190,419

[22] Filed: Nov. 12, 1998

[51] Int. Cl.[7] ........................................................ A21B 1/00
[52] U.S. Cl. ........................... 219/407; 219/405; 219/406
[58] Field of Search ..................................... 219/214, 405, 219/407, 406, 410, 411, 521, 385, 215; 392/418, 414; 99/483; 34/202; 312/236

[56] References Cited

U.S. PATENT DOCUMENTS

| | | | |
|---|---|---|---|
| 2,419,643 | 4/1947 | Hudson | 219/410 |
| 3,275,393 | 9/1966 | Stentz et al. | 312/403 |
| 3,293,406 | 12/1966 | Bain | 392/307 |
| 3,527,925 | 9/1970 | Toyooka et al. | 219/521 |
| 3,586,823 | 6/1971 | Schler . | |
| 3,742,178 | 6/1973 | Harnden, Jr. . | |
| 4,007,810 | 2/1977 | Weddendorf . | |
| 4,074,108 | 2/1978 | King . | |
| 4,343,985 | 8/1982 | Wilson et al. . | |
| 4,523,078 | 6/1985 | Lehmann | 219/202 |
| 5,282,145 | 1/1994 | Lipson et al. | 364/477.02 |
| 5,440,975 | 8/1995 | Bean . | |
| 5,477,777 | 12/1995 | Oppermann . | |

*Primary Examiner*—Teresa Walberg
*Assistant Examiner*—Vinod D Patel
*Attorney, Agent, or Firm*—Foley & Lardner

[57] ABSTRACT

A topless bin for holding and warming food items such as wrapped sandwiches, fries, or breakfast meals, is disclosed herein. The bin includes a base, a base heating element, a pair of side walls and a pair of side heating elements. The base has a horizontal holding surface for supporting the food items being held. The base heating element is thermally coupled to the holding surface such that the food items are warmed thereby. Each side wall has a first portion extending upwardly perpendicular to and at opposite sides of the base, and a second portion extending upwardly at an inclined angle from the first portion. Each side heating element is supported by the second portion of one of the side walls. The inclination is selected to direct heat at an angle from the respective side heating element toward the holding surface such that the food items are also warmed thereby. Thus, the food items are warmed without either an overhead heat source or convected heat from an air stream. The heat sources can also be implemented as infrared heating elements.

14 Claims, 3 Drawing Sheets

TOPLESS HOLDING BIN WITH SIDE HEAT SOURCE

FIELD OF THE INVENTION

The invention relates generally to the field of bins or stations for holding items, such as food items, at elevated temperatures. More particularly, the invention relates to a topless bin for holding and warming items, such as food items, wherein heat is applied to the items by at least one side heat source.

BACKGROUND OF THE INVENTION

Holding bins or stations for holding items, such as packaged food (e.g., wrapped sandwiches, fries, or breakfast meals), and keeping the packaged food at elevated temperatures while in inventory prior to sale at restaurants, food counters, cafeterias, etc. are known. These holding bins typically include one or more shelves for supporting the food, with each shelf having top and bottom heat sources for warming the food supported by that shelf. The bottom heat source typically warms the food from underneath using conducted heat. The top heat source warms the food from overhead using heat lamps or infrared heat sources suspended above the food using an appropriate overhead structure. The food may also be warmed by convected heat from a warm stream of air aimed at the food.

Existing food holding bins, however, have a number of drawbacks. First, the overhead structure used to suspend the heat lamps or infrared heat sources above the food gives these bins a "commercial" appearance, and gives prospective food purchasers the impression the food has been held for an unappetizingly long time. Both of these characteristics negatively impact the consumer's perception of food quality and, thus, negatively impact the consumer's willingness to purchase the food. Second, the heat sources used by the existing bins have serious drawbacks in their ability to properly warm and maintain the food. Heat lamps are "spotty", so that heat is provided to only small areas of the lower level. Infrared metal and glass elements generally provide a more uniform source of heat, but have high surface temperatures. The warm air applied to the food by convection heaters dries out the food by rapid moisture evaporation, and convection heaters are relatively complex.

Some bins for holding and warming food items use a top heat source in combination with a top cover. The top cover permits reflection of heat generated by the top heat source towards the food items being held in the bin. However, the top heat source and top cover of such bins also imparts a "commercial" appearance to such bins, and gives the impression to prospective purchasers that the food items have been held for an unappetizingly long time. Further, the top heat source and top cover inherently obstruct a customer's view of the food items.

Bins having a top heat source, and optionally a top cover, are quite bulky. In addition, some food holding units have multiple horizontal shelves for holding food items and keeping them warm. These added levels further increase the bulk of these bins, make loading and unloading of food items difficult, and add to a consumer's impression that the food has been held in the bin for a significant time.

Accordingly, it would be advantageous to provide a holding bin for holding and warming items such as food products that overcomes these and other disadvantages of the prior art. In particular, it would be advantageous to provide a holding bin for holding and warming food items that does not require an overhead source of heat. The elimination of the overhead heat source would provide a less "commercial" appearance, lessen the consumer's impression that the food items have been held for a long time, and provide prospective food purchasers with an unobstructed view of the food, along with unobstructed access to the food. Further, it would be advantageous to provide a food holding and warming bin with heat sources that uniformly distribute heat to the food being held, do not have any high surface temperatures, and do not dry food through rapid evaporation. It would be advantageous if such heat sources had a relatively simple structure with no moving parts for improved reliability and maintainability. Also, it would be advantageous to provide a food holding and warming bin with only a single horizontal holding surface for supporting the food items. Such a bin would have decreased bulkiness, and would be easier to load and unload, than existing bins with multiple shelves. It would also be advantageous to provide a food holding bin having a channel through which the items may be clearly viewed and easily moved by prospective customers.

SUMMARY OF THE INVENTION

One embodiment of the invention relates to a topless bin for holding and warming food items. The bin includes a base having a generally horizontal holding surface for supporting the food items, a side wall extending upwardly from the base, and a source of heat supported by the side wall such that heat is directed at an angle from the source of heat toward the holding surface, wherein the food items being supported on the base are warmed at least by the source of heat.

Another embodiment of the invention also relates to a topless bin for holding and warming food items. The bin includes a base having a generally horizontal holding surface for supporting the food items and a base heating element thermally coupled to the holding surface, wherein the food items are warmed in part by the base heating element. The bin also includes a pair of side walls, each having a first portion extending upwardly generally perpendicular to the base at opposite sides of the base and a second portion extending upwardly at an inclined angle from the first portion, and a pair of side heating elements. Each side heating element is supported by the second portion of one of the side walls, and the inclination of the second portion of each side wall is selected to direct heat at an angle from the respective side heating element toward the holding surface, wherein the supported food items are also warmed in part by the pair of side heating elements.

Another embodiment of the invention relates to a method of holding and warming items using a topless bin. The bin includes a base having a generally horizontal holding surface for supporting the food items, a side wall extending upwardly from the base, and a source of heat supported by the side wall. The method includes the steps of placing the food items on the holding surface of the topless bin, generating heat by applying power to the source of heat, and directing the heat at an angle downwardly from the source of heat toward the holding surface so that the food items are warmed by the source of heat.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
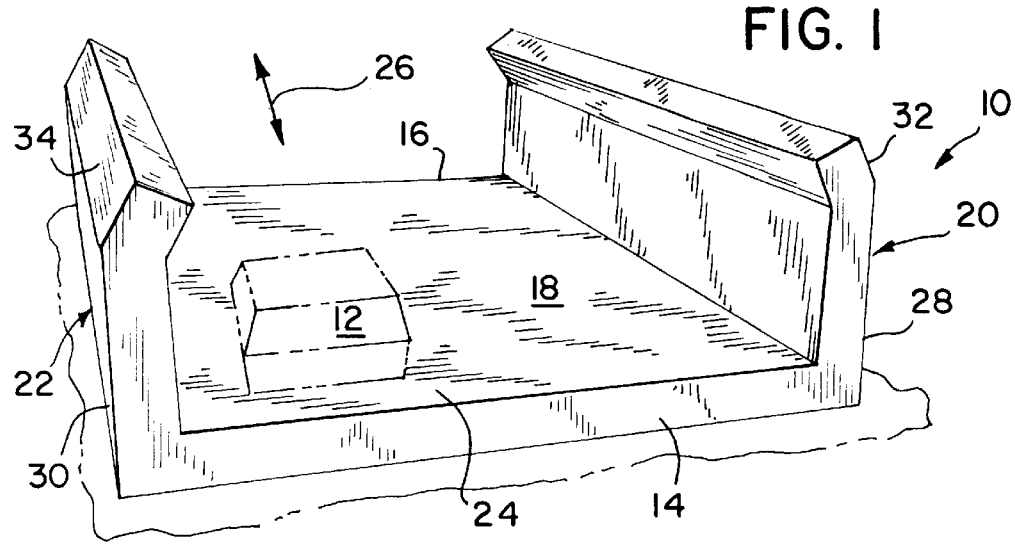
FIG. 1 is a front perspective view showing a topless bin for holding and warming items such as packaged food in accordance with the present invention.
Figure 2:
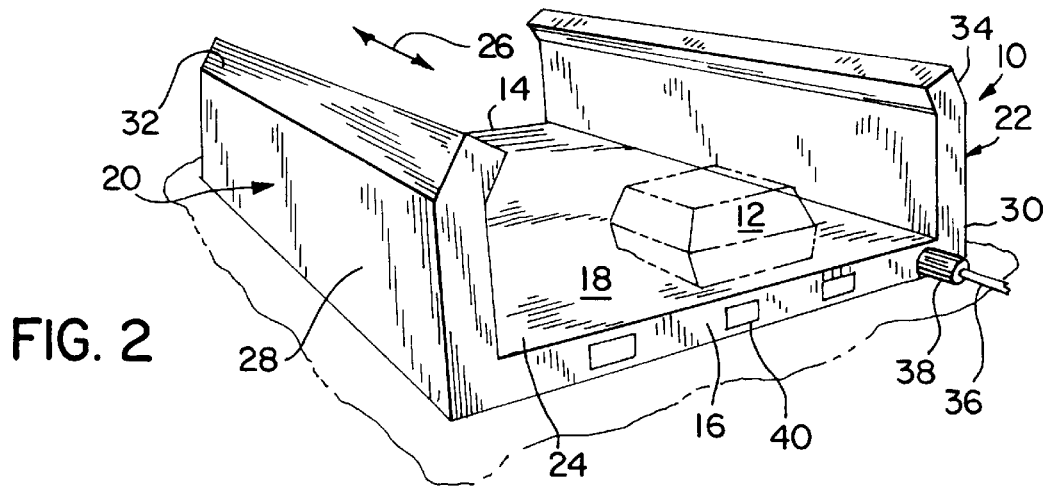
FIG. 2 is a rear perspective view of the topless bin shown in FIG. 1.

Referring to FIGS. 1–2, a topless bin 10 for holding and warming items such as packaged food 12 is shown. Although FIGS. 1–2 show the packaged food item 12 as a packaged sandwich (e.g., a burger), topless bin 10 may be used to hold and warm other food products such as french-fries, breakfast meals, etc. Topless bin 10 includes a front end 14, a rear end 16, a base 18, and a pair of side wall assemblies 20 and 22. Base 18 provides a generally horizontal holding surface 24 for items 12. Thus, base 18 and side wall assemblies 20 and 22 define a channel 26 through which the food items 12 may be clearly viewed, and easily loaded and unloaded, by both the prospective customers (typically located at front end 14 of bin 10), and by the food-service workers (typically located at rear end 16 of bin 10). During operation, items 12 are placed on surface 24 of bin 10 through channel 26 after having been cooked, are then maintained at temperatures suitable for food prior to sale, and are then removed by the customers or food-service workers.

Right and left side wall assemblies 20 and 22, respectively, extend upwardly from base 18 at opposite sides of the base. Each side wall assembly 20 and 22 preferably includes a bottom portion 28 and 30, respectively, extending upwardly generally perpendicular to base 18, and an inclined portion 32 and 34 extending upwardly from bottom portion 28 and 30, respectively, at an angle. Inclined portions 32 and 34 are each inclined upwardly from respective bottom portions 28 and 30 by the same positive angle. Preferably, base 18, bottom portions 28 and 30, and inclined portions 32 and 34 each have a rectangular shape. Alternatively, bin 10 can be a three-sided topless bin with a third side wall (not shown) extending upwardly at rear end 16 of base 18 between side walls 20 and 22.

Referring specifically to FIG. 2, topless bin 10 receives electrical power through an electrical cord 36 connected to rear end 16 of bin 10 via a heavy duty cord grip connector 38. The electricity powers a number of sources of heat used to warm food items 12, as described below. The electrical requirements of topless bin 10, in one embodiment, are 4.6 amps of 120 volts alternating current at 60 Hz for a total input power requirement of 550 watts. Of course, the electrical requirements of topless bin 10 can differ depending upon the heating components, and may include receiving 50 Hz power in markets where 50 Hz power is common. Rear end 16 of bin 10 includes a lighted on/off rocker switch 40 for controlling the on/off status of the electrical heating elements within bin 10, and for indicating whether the sources of heat in bin 10 are on or off (i.e., powered or unpowered).

In one embodiment, topless bin 10 has exterior dimensions of 18 inches in width, 24 inches in length and 7 inches in height. The interior dimensions of a compartment formed by base 18 and side wall assemblies 20 and 22 are 15.375 inches in width, 24 inches in length and 7 inches in height. The angle of inclination between each side wall bottom portion 28 and 30 and its respective inclined portion is approximately 22 degrees from the vertical. In other embodiments, other exterior and interior dimensions of topless bin 10 may be used, with appropriate adjustments being made to the angle of inclination between the bottom and the inclined portions of each side wall assembly 20 and 22 such that heat is focussed onto the items 12.

The external surfaces of base 18 and side wall assemblies 20 and 22 are preferably fabricated from heavy duty, commercial food-grade, stainless steel.

Figure 3:
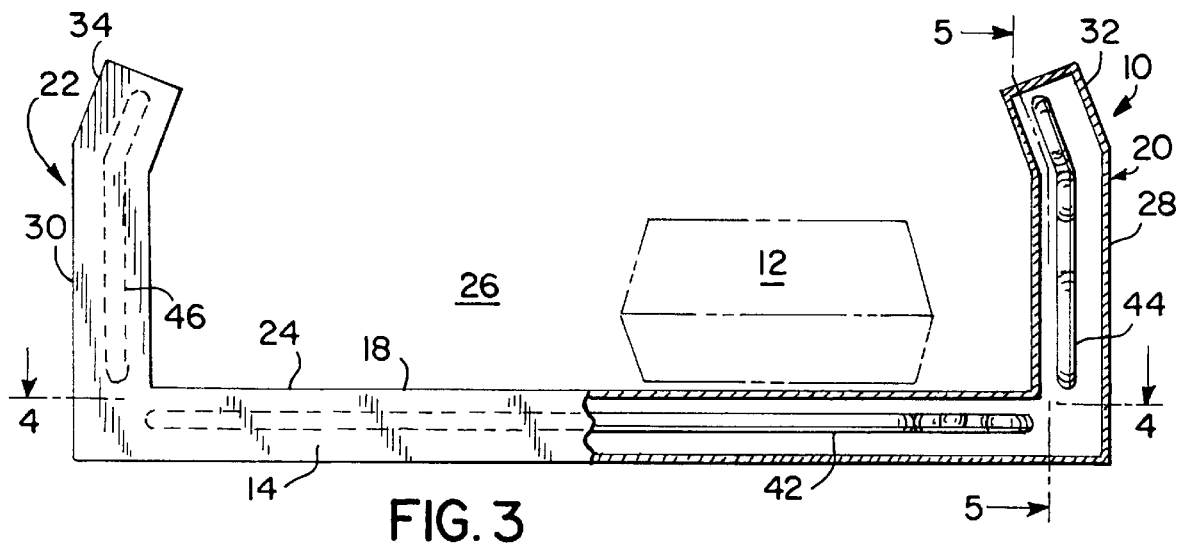
FIG. 3 is a front view of the topless bin shown in FIG. 1.
Figure 4:
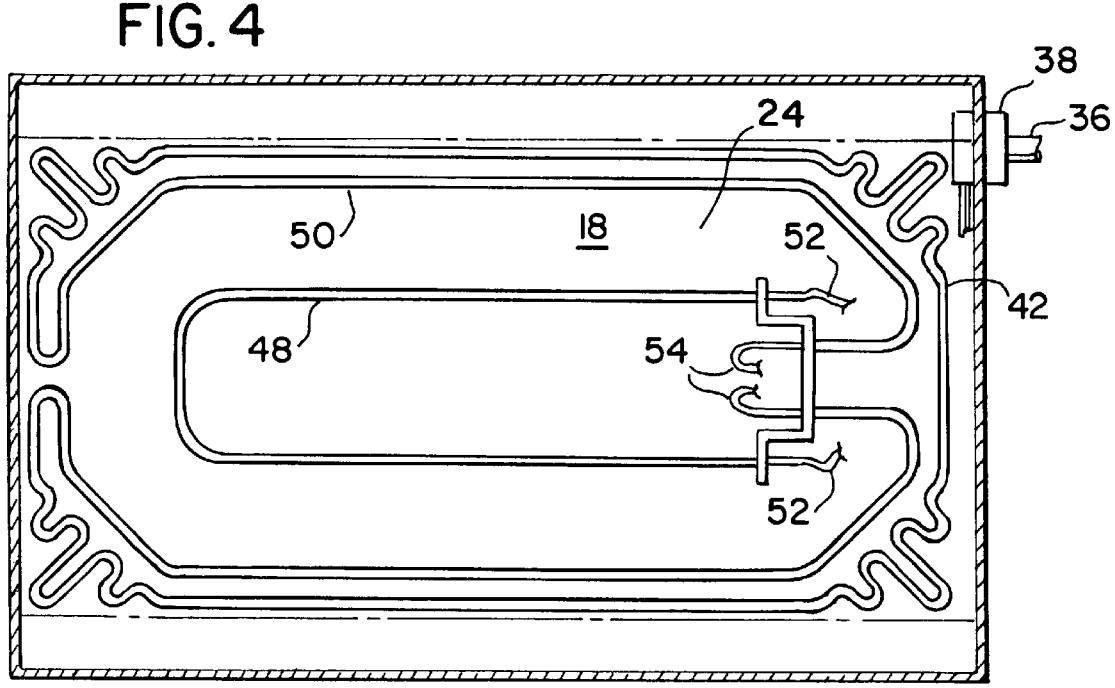
FIG. 4 is a cross-sectional view of the topless bin of FIG. 1 taken along line 4—4 in FIG. 3 to show the configuration of the base heat source.
Figure 5:
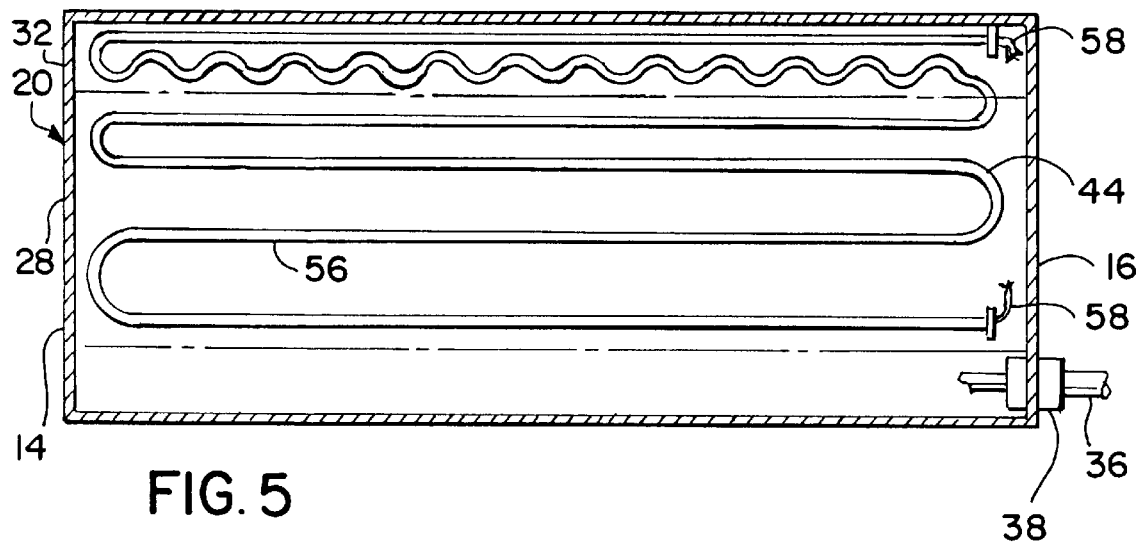
FIG. 5 is a cross-sectional view of the topless bin of FIG. 1 taken along line 5—5 in FIG. 3 to show the configuration of one side heat source.

Referring to FIGS. 3–5, topless bin 10 includes a plurality of heat sources including a base heat source 42 and a pair of side heat sources 44 and 46. Base heat source 42 is located within base 18 and is thermally coupled to holding surface 24 of base 18 so that heat generated by source 42 is conducted to surface 24 to warm food items 12 from the bottom. Side heat sources 44 and 46 are located within and are supported by side wall assemblies 20 and 22. Side heat sources 44 and 46 are thermally coupled to the interior surfaces of side wall assemblies 20 and 22 so that heat generated by sources 44 and 46 are radiated or directed at an angle from the respective side wall assembly 20 and 22 towards the food items 12.

In a preferred embodiment, base heat source 42 and side heat sources 44 and 46 are heating elements formed from strips of resistive wire adhered to the internal surfaces of base 18 and side wall assemblies 20 and 22, respectively.

Referring specifically to FIG. 4, base heat source 42 is formed from strips of resistive wire arranged or configured to heat holding surface 24 of bin 10. The configuration of this resistive wire includes a first heating loop 48 generally located in the inner area of surface 24, and a second heating loop 50, each of which is supplied with electrical power through respective leads 52 and 54. The amount of heat generated by the resistive wire is proportional to the length of wire per unit of area. Providing curves in the pattern will increase the amount of heat generated as compared to straight lines, as will spacing strips of wire closer together. Thus, it is readily apparent that base heat source 42 generates a relatively low watt density in the inner area of surface 24, a medium watt density around the perimeter areas of surface 24, and a relatively high watt density in the corner areas of surface 24. The particular patterns shown in FIG. 4 were selected such that food items 12 placed anywhere on surface 24 are heated to approximately the same degree of warmth. Other wire patterns and numbers of loops can be used depending on the application.

Referring specifically to FIG. 5, side heat source 44 is also formed from resistive wire strips arranged to heat the interior surface of side wall assembly 20. The resistive wire is arranged with a single side heating loop 56 which receives electrical power through leads 58. Due to this arrangement, it is readily apparent that side heat source 44 generates a relatively low watt density in the lower area of bottom portion 28, a medium watt density in the upper area of bottom portion 28, and a relatively high watt density in inclined portion 32 of side wall assembly 20. Thus, the interior surface of inclined portion 32 is heated a relatively high amount. Preferably, the increased watt density of the top four passes of the resistive wire at the top of side wall assembly 20 provides about sixty to seventy percent (60%–70%) of the total wattage of the side heat source 44. The arrangement within the other side wall assembly 22 is the mirror image of that in assembly 20. Other patterns of resistive wire, and other numbers of heating loops can be used, and the loops of base and side heat sources 42–46 can be combined into a single loop.

The strips of resistive wire used to form the heating elements are available from Group Dekko of Iowa. These strips are formed with an adhesive-backed aluminum foil backing, and are easily adapted to form the patterns of FIGS. 4 and 5 before being adhered to the inner, interior surfaces of base 18 and side wall assemblies 20 and 22. Power dissipation through the strips is limited to a maximum of approximately 3.5 watts per lineal inch to avoid overheating of the adhesive. To insure that exterior contact surfaces of bin 10 remain cool to the touch, the interior volumes of bin 10 (i.e., between base heat source 42 and the bottom of base 18, and between each side heat source 44 and 46 and the outside surface of the respective side wall) are filled with a suitable, heat resistant insulation material (not shown).

To insure that heat generated by base heat source 42 and side heat sources 44 and 46 is evenly distributed along the interior surfaces of topless bin 10, the interior surfaces are preferably coated with a hard coat layer of material (not shown) such that the heat is uniformly radiated or directed towards food items 12. Preferably, the hard coat layer comprises an aluminum black hard coat material anodized with a surface hardness of 45–50 RC, a thickness of approximately 0.004 inches, and a shape that focuses heat towards the center of holding surface 24. This layer is applied to the interior surface of bin 10, except for approximately the first inch at front end 14 and rear end 16 of bin 10 to help prevent the hard coat layer from separating from the surfaces when food items 12 are loaded and unloaded.

The angle of inclination of inclined portions 32 and 34 of side wall assemblies 20 and 22 is selected such that the heat generated by the resistive wires supported by portions 32 and 34 is radiated uniformly by the hard coat material on portions 32 and 34 towards holding surface 24. In particular, the angle is selected such that the heat radiated from portions 32 and 34 is focussed towards the central area of surface 24 such that items 12 located in bin 10 are heated in part thereby. Thus, items 12 are warmed in part by conductive heat from base heat source 42 and in part by heat radiated from side heat sources 44 and 46. Heat generated by the resistive wires in bottom portions 28 and 30 of side wall assemblies 20 and 22 also radiates outward towards items 12 to provide additional heat. The angle selected for the bin 10 having the dimensions stated above is 22° from vertical. However, the angle will change as dimensions change. The proper angle can be determined through geometrical analysis of the bin, thermal modeling, and/or empirical studies.

Figure 6:
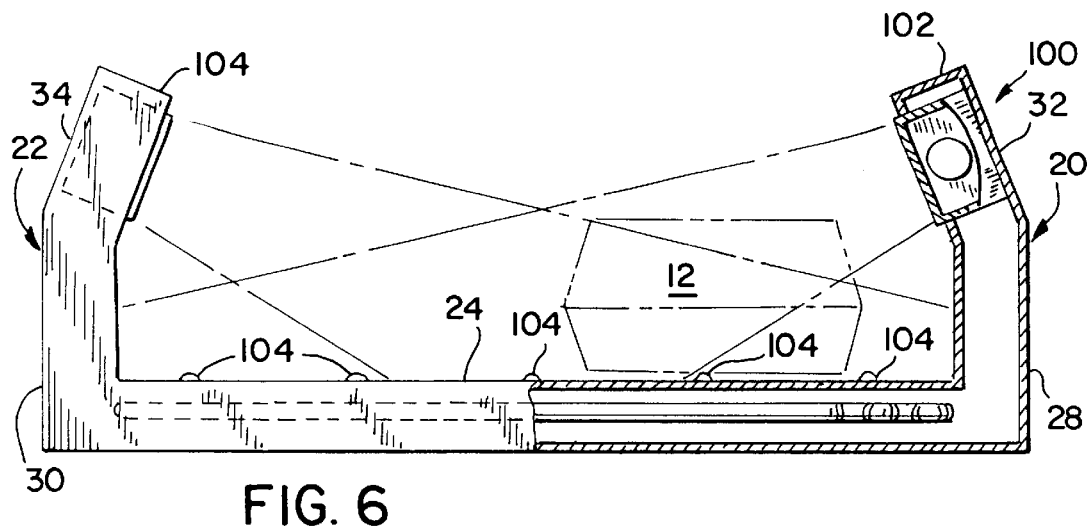
FIG. 6 is a front view of a topless food holding and warming bin according to a second embodiment of the invention wherein the electric side heat source of the bin shown in FIG. 1 are replaced by infrared heat sources.
Figure 7:
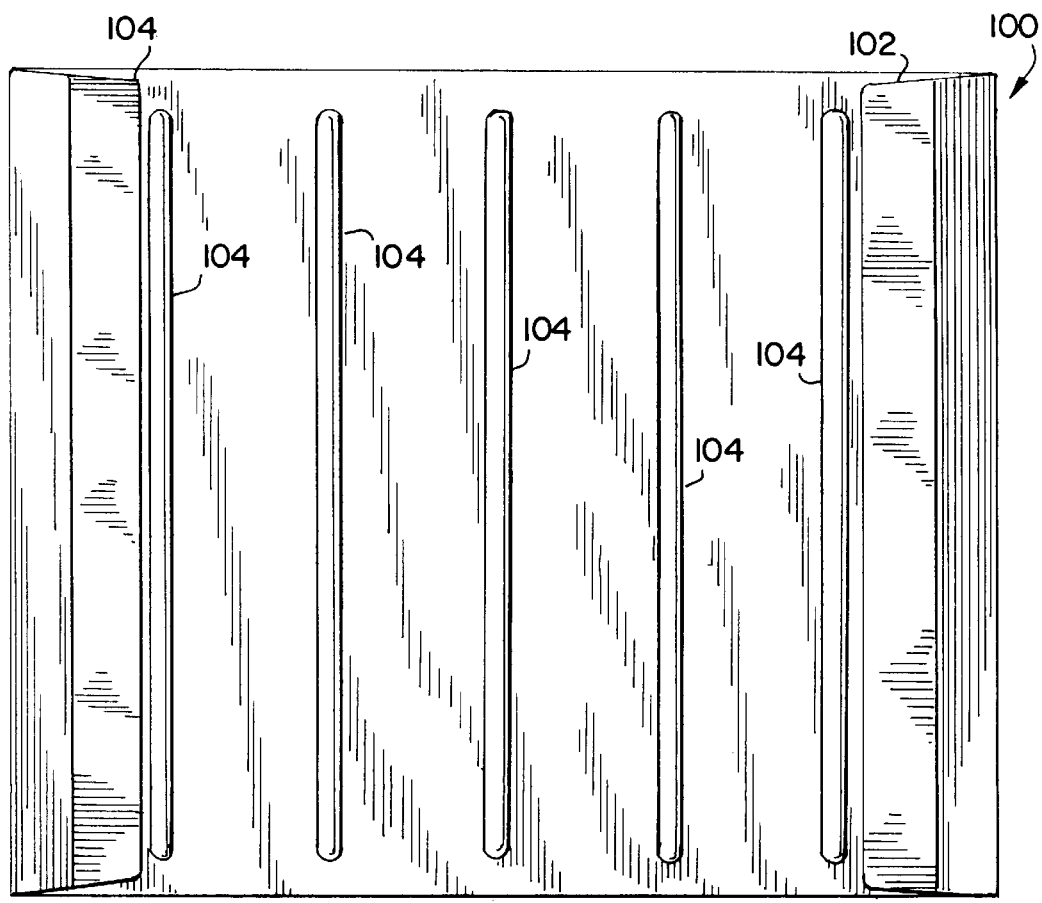
FIG. 7 is a top view of the topless bin shown in FIG. 6.

Proceeding next to FIGS. 6–7, a topless bin 100 according to another embodiment of the invention is shown. Topless bin 100 is similar to topless bin 10 of FIG. 1, except that bin 100 includes an inclined heat source 102 and ridges 104. Inclined heat source 102 includes an infrared heating element supported by inclined portions 32 and 34 of side wall assemblies 20 and 22. The heating elements are inclined at an angle such that radiated infrared heat is aimed or focused downwardly upon surface 24, and items 12 supported thereby. Preferably, the infrared light emitter induces an GRAIH-19 Infrablack heater available from Hatco Corp. of Wis., the assignee of the present invention. Other heat sources may also be added to the side wall assemblies to increase the heat capacity of bin 100. The base of topless bin 100 also includes base ridges 104, which span the base from front to rear of the bin. Ridges 104 serve to separate and organize the food items 12. Preferably, the base of topless bin is 24 inches in length, 2.25 inches in height, and 17 inches in length. The side walls of topless bin 100 are preferably 10.5 inches in height.

While the embodiments illustrated in the FIGURES and described above are presently preferred, it should be understood that these embodiments are offered by way of example only, and various alternatives would be apparent to those of skill in the art. For example, the topless bin could include a single side wall member it either side of the base extending at an inclined angle from the base with a heating element located atop the single member and oriented such that heat radiated from the heat source is focused at an angle down onto the food items 12. The invention is not limited to a particular embodiment, but extends to various modifications that nevertheless fall within the scope of the appended claims.

What is claimed is:

1. A topless bin for holding and warming food items, comprising:
   a base having a generally horizontal holding surface for supporting the food items;
   a side wall extending upwardly from the base; and
   a source of heat supported by the side wall and configured to direct heat at an angle downwardly from the source of heat toward the holding surface, wherein the food items being supported on the base are warmed at least by the source of heat and the food items are viewable from overhead the bin.

2. The topless bin of claim 1, wherein at least a portion of the side wall is inclined with respect to the holding surface and the source of heat is supported by the inclined portion of the side wall, the inclination of the inclined portion selected to direct the heat at the angle from the source of heat toward the holding surface.

3. The topless bin of claim 2, wherein a bottom portion of the side wall extends upwardly generally perpendicular to the base, and the inclined portion of the side wall extends upwardly at an inclined angle from the bottom portion.

4. The topless bin of claim 2, further comprising a second source of heat located adjacent to the holding surface, wherein the food items held in the bin are also warmed by the second source of heat.

5. The topless bin of claim 4, wherein the first and the second sources of heat include first and second electric heating elements, respectively, the first electric heating element thermally coupled to the inclined portion of the side wall and the second electric heating element thermally coupled to the holding surface.

6. The topless bin of claim 5, wherein the inclined portion of the side wall and the holding surface are coated with a hard coat material to uniformly direct the heat toward the food items.

7. The topless bin of claim 2, wherein the source of heat includes an electric heating element thermally coupled to the inclined portion of the side wall, the inclined portion coated with a hard coat material to uniformly direct the heat.

8. The topless bin of claim 1, wherein the source of heat includes an infrared heating element configured to radiate infrared heat, the infrared heat being directed at the angle toward the food items being held.

9. A topless bin for holding and warming food items, comprising:
   a base having a generally horizontal holding surface for supporting the food items;

a base heating element thermally coupled to the holding surface, wherein the supported food items are warmed in part by the base heating element;

a pair of side walls, each side wall having a first portion extending upwardly generally perpendicular to the base at opposite sides of the base and a second portion extending upwardly at an inclined angle from the first portion; and a pair of side heating elements, each side heating element supported by the second portion of one of the side walls, the inclination of the second portion of each side wall being selected to direct heat at an angle downwardly from the respective side heating element toward the holding surface, wherein the supported food items are also warmed in part by the pair of side heating elements and the food items are viewable from overhead the bin.

10. The topless bin of claim 9, wherein the base heating element includes a resistive electric heating element for warming the holding surface.

11. The topless bin of claim 10, wherein the holding surface is coated with a hard coat material to uniformly distribute heat from the base heating element.

12. The topless bin of claim 9, wherein each side heating element includes a resistive electric heating element.

13. The topless bin of claim 12, wherein the second portion of each side wall is coated with a hard coat material to uniformly radiate heat from the respective side heating element toward the holding surface.

14. The topless bin of claim 9, wherein each side heating element includes an infrared heating element configured to radiate infrared heat.

* * * * *